United States Patent
Furuichi et al.

(10) Patent No.: US 6,510,115 B2
(45) Date of Patent: Jan. 21, 2003

(54) INFORMATION RECORDING AND REPRODUCING APPARATUS AND DISK DISCRIMINATION METHOD THEREOF

(75) Inventors: Tokinori Furuichi, Yokohama (JP); Yuji Hirai, Hiratsuka (JP); Hiroyuki Hayashi, Hitachinaka (JP); Gohshi Jin, Hitachinaka (JP); Kazuhiro Oda, Hitachinaka (JP); Naomi Nomura, Yokohama (JP); Seiji Inaba, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 86 days.

(21) Appl. No.: 09/840,268

(22) Filed: Apr. 24, 2001

(65) Prior Publication Data

US 2002/0012303 A1 Jan. 31, 2002

(30) Foreign Application Priority Data

Jun. 23, 2000 (JP) ........................................ 2000-194876

(51) Int. Cl.$^7$ ............................................... G11B 3/90
(52) U.S. Cl. ................................... 369/53.22; 369/47.5
(58) Field of Search .............................. 369/47.5, 47.55, 369/53.22, 53.23, 53.26, 53.27, 53.37, 53.41, 53.45, 116, 121, 124.15

(56) References Cited

U.S. PATENT DOCUMENTS

| | | | | | |
|---|---|---|---|---|---|
| 5,859,822 | A | * | 1/1999 | Inoue et al. | 369/53.22 |
| 5,912,868 | A | * | 6/1999 | Hayashi et al. | 369/44.24 |
| 6,115,336 | A | * | 9/2000 | Okada | 369/53.22 |
| 6,201,777 | B1 | * | 3/2001 | Tsuchiya et al. | 369/53.23 |

* cited by examiner

Primary Examiner—Paul W. Huber
(74) Attorney, Agent, or Firm—McDermott, Will & Emery

(57) ABSTRACT

The present invention provides a single information recording and reproducing apparatus that is used to record data to multiple disks that are to be recorded on using different wavelengths. More specifically, the present invention provides an apparatus that accurately discriminates disk types while preventing disk damage and accidental recording of data during the disk type discrimination operation. The disk type is determined using the intensity of light reflected from the disk. Information is encoded using an encoder corresponding to the disk type. The resulting signal is used to drive a laser corresponding to the disk type, and information is recorded.

3 Claims, 2 Drawing Sheets

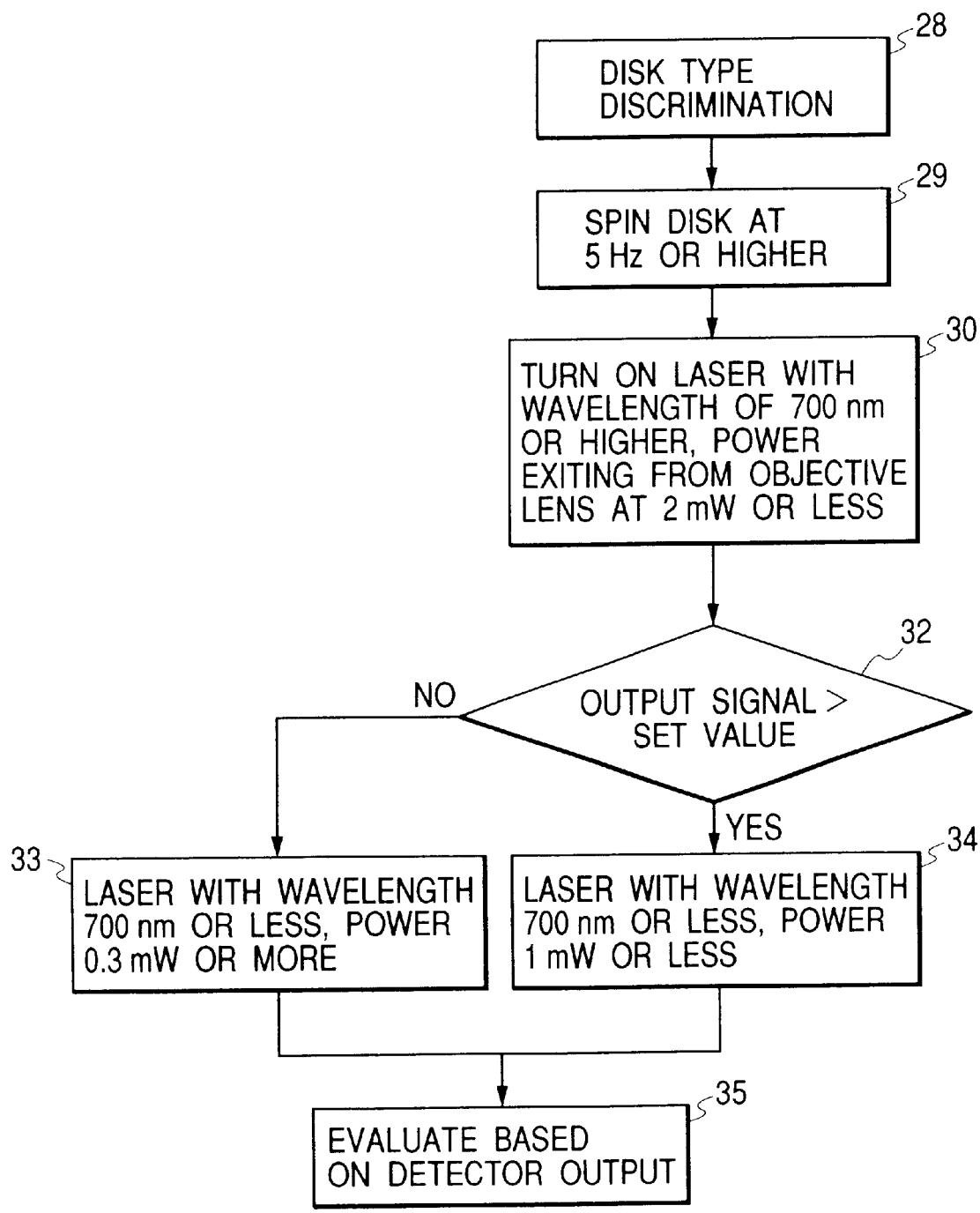

INFORMATION RECORDING AND REPRODUCING APPARATUS AND DISK DISCRIMINATION METHOD THEREOF

BACKGROUND OF THE INVENTION

The present invention relates to a recording apparatus capable of recording to different types of disks using lasers with different wavelengths.

Recordable optical disks that have been proposed include CD-R and CD-RW disks, which are based on compact disks and record and playback data using a wavelength of approximately 780 nm, and DVD-RAM, DVD-R, and DVD-RW disks, which are based on DVD disks and record and playback data using a wavelength of approximately 650 nm.

An example of a conventional information recording and reproducing apparatus is an information recording and reproducing apparatus for CD-R and CD-RW disks that uses a laser with a wavelength of approximately 780 nm only. Also, an information recording and reproducing apparatus for DVD-RAM disks has been developed that is equipped with a laser with a wavelength of approximately 650 nm and a playback laser having a wavelength of approximately 780 nm, thus allowing CD-R and CD-RW disks to be played back. This device is able to perform record/playback operations on DVD-RAM disks and playback operations on CD-R and CD-RW disks by focusing the laser beam with objective lenses that correspond to the wavelength of the laser being used, with an objective lens being selected for each disk playback operation.

SUMMARY OF THE INVENTION

However, while the information recording and reproducing apparatus for DVD-RAM disks described above is capable of playing back CD-R and CD-RW disks, CD-R recording is not possible with the 650 nm DVD-RAM laser due to the fact that the reflective properties of the organic pigment used in the disk recording surface of CD-R and CD-RW disks is dependent on the laser wavelength. In other words, it is not possible to record on different disk types that require different wavelengths for recording.

Disk type discrimination must be performed in order to allow recording on different disk types that require different wavelengths for recording such as DVD-RAM and CD-R and CD-RW. However, due to the dependence of reflective properties on laser wavelength, applying a laser beam may result in data being recorded on the recording surface or damage to the recording surface. If a low laser output is used, the detector output will also be low, resulting in a low S/N ratio and reduced accuracy in the disk type discrimination operation. Thus, the laser wavelength and output used for the discrimination operation must be appropriate.

The present invention provides an information recording and reproducing apparatus capable of recording to multiple disk types requiring different laser wavelengths for recording operations.

To achieve this object, the present invention is structured as described below.

A pickup includes a first laser emitting light with a wavelength of at least 700 nm, a second laser emitting light with a wavelength of less than 700 nm, an objective lens focusing light emitted by the lasers onto a disk, and an optical detector detecting light reflected off of the disk from the lasers. The first laser can be, for example, a laser suited for recording information on CD-based recordable disks or the like such as CD-R and CD-RW disks. The second laser can be, for example, a laser suited for recording information on DVD-based disks or the like such as DVD-RAM disks. Means for rotating rotates the disk at at least 5 Hz before beaming light from the first laser or the second laser onto the disk. Laser driving means drives the lasers. Means for discriminating disks discriminates disk types using amplitudes of reflected light obtained from the optical detector. After rotating means begins rotating the disk at at least 5 Hz, driving means turns on the first laser to emit light so that power exiting the objective lens is no more than 2 mW. Discriminating means determines if a first amplitude is greater than a predetermined value, the first amplitude being the amplitude of reflected light obtained by the optical detector when driving means turns on the first laser to emit light so that power exiting the objective lens is no more than 2 mW is greater than a predetermined value. Laser driving means is controlled so that if the predetermined value is greater the second laser emits light at no more than 1 mW and if the predetermined value is less the second laser emits light at at least 0.3 mW. A second amplitude of reflected light obtained by the optical detector when the second laser is turned on is compared with the first amplitude to perform disk discrimination.

According to another aspect of the present invention, an information recording and reproducing apparatus also includes: a first encoder and a first laser driver corresponding to information recording operations using the first laser; and a second encoder and a second laser driver corresponding to information recording operations using the second laser. Information can be recorded to a plurality of disk types by selecting between the first encoder and the first laser driver and said second encoder and the second laser driver based on discrimination results from disk discriminating means.

BRIEF DESCRIPTION OF THE DRAWINGS

FIG. 2 is a flowchart of a disk type discrimination operation according to an embodiment of the present invention.

DETAILED DESCRIPTION OF THE INVENTION

Figure 1:
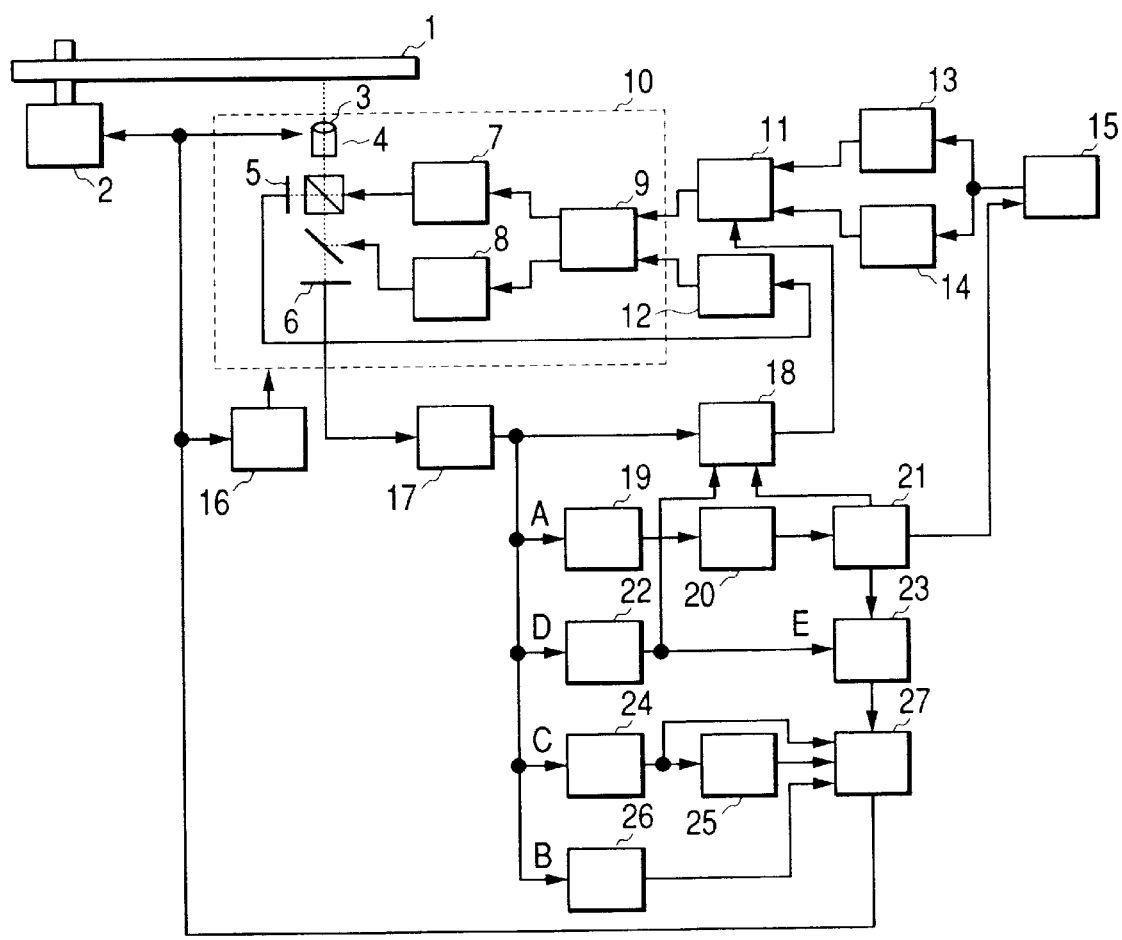
FIG. 1 is a block diagram showing an embodiment of the present invention.

FIG. 1 is a block diagram of an information recording and reproducing apparatus according to an embodiment of the present invention.

A laser 7 is a first laser emitting a first wavelength such as a CD laser with a wavelength of 780 nm. A laser 8 is a second laser emitting a second wavelength such as a DVD laser with a wavelength of 650 nm. A portion of the light emitted from one of these lasers illuminates a monitor 5, which performs light-current-voltage conversion. This signal is sent to a control circuit 12. Sample-and-hold is performed as needed. Marks corresponding to pits and spaces corresponding to reflective areas are taken out and a comparison is made to a target voltage. A signal in which the current increases when the light intensity is low and decreases when the light intensity is high is sent to a laser driver 9. Based on this signal, the current to the laser 7 is increased or decreased to provide the target laser light intensity.

The remaining light emitted from the first laser 7 or the second laser 8 is focused using an objective lens 3 and an actuator 4 supporting the objective lens 3 is moved perpendicular to the disk surface so that the light is focused on a disk 1. Coating is applied to the objective lens 3 and the numerical aperture of the lens is changed according to the wavelength of the laser.

Light reflected from the disk 1, and light intensity-current-voltage conversion is performed on the light intensities at multiple regions of a detector 6. The amplification gain provided by the detector 6 can be selected based on the disk type, and delays caused by saturation in the amplifier are prevented by adding a voltage limiter to the amplifier. The multiple signals obtained from the multiple regions of the detector 6 are calculated by a matrix circuit 17 and the following signals are generated: an RF signal A extracting the signal recorded on the disk; a focus error signal B having an output based on the distance between the disk 1 and the focus lens 3; a tracking error signal C having an output based on lateral track traversal; and a wobble signal D containing either a signal indicating the position of the disk 1 or the like or a signal used to control disk rotation.

The focus error signal B is sent to a focus control circuit 26 and is used by a focus servo, which includes the actuator 4. Phase correction is performed for the necessary bandwidth based on the disk type determined in the disk discrimination operation described later and the disk speed. The resulting signal is sent to a driver circuit 27, and the actuator 4 is operated perpendicular to the disk surface so that the focal point is on the disk. Various methods for generating the focus error signal B have been proposed, with the method involving astigmatism being the current standard method. However, for DVD-RAM disks, errors in the tracking direction leak into the focus error signal. Thus, the use of the knife-edge method, which minimizes this influence, would be desirable.

The tracking error signal C is sent to the tracking control circuit 24 and is used in the tracking servo, which includes the actuator 4. Phase correction is performed for the necessary bandwidth based on the disk type and the disk speed, and the resulting signal is sent to the driver circuit 27. The actuator 4 is operated in the radial direction of the disk, and a track is acquired. Various methods for generating the tracking error signal C have been proposed. A push-pull method, involving differential push-pull using a sub-beam, is generally used in recording devices. However, DVD-R disk compatibility is not possible due to the different track pitch compared to that of DVD-RAM disks (the track pitch is roughly double). Thus, for DVD-R disk compatibility, a beam splitter operating integrally with the objective lens must be provided and push-pull must be obtained using the split beams.

Also, the signal from the tracking control circuit 24 is sent to a pickup feed control circuit 25, where low-frequency signals are extracted and output to the driver circuit 27. This signal drives a pickup feed motor 16, which moves the pickup 10 radially across the disk.

Furthermore, in order to reduce deviations in the pickup feed, the track pitch of the disk is obtained at the start of disk playback, information of the radial progression of the laser beam is obtained from the rotation information of the spindle motor, and feedforward control is added.

The wobble signal D is sent to a wobble signal processing circuit 22, which extracts disk position information and the like based on the disk type and extracts a wobble sync signal E used to control rotation of the disk.

The disk playback RF signal A is sent to a pre-amp 19, where AGC and equalization is applied. The resulting output is sent to a data strobe circuit 20, which generates a data clock and performs bi-level conversion on the data. The resulting output is sent to a signal processing circuit 21. The signal is decoded based on the disk type, and the data read from the disk is sent out by way of an interface 15.

A signal synchronized with the read data and the wobble sync signal E are sent to a selection circuit 23. A reference signal is compared with the signal synchronized with the read data for playback operations and with the wobble sync signal E for record operations. Based on this, a control signal for controlling the spindle motor 2, which rotates the disk, is generated. This output is sent to the driver 27, which controls the rotation of the spindle motor 2.

When data is being recorded, the necessary encoding operations for the data received from the interface 15 are performed by a first encoder 13 and a second encoder 14 based on the disk type. The resulting output is sent to a selection circuit 11. Using the output of a disk type discrimination circuit 18, described later, the selection circuit 11 selects a signal to be output, which is then sent to the laser driver 9. Data is recorded on the disk 1 by varying the light intensity of the laser.

The above description presented the operations based on the disk type. The following is a description of how disk types are determined before recording/playback of the disk is performed.

The output from the matrix circuit 17 is sent to the disk type discrimination circuit 18. The first laser 7 is lit and the actuator 4 is moved by the focus control circuit 26 to obtain a first output, in the form of the amplitude of the focus error signal near the focus point. Next, the second laser 8 is lit and the actuator 4 is moved by the focus control circuit 26 to obtain a second output, in the form of the amplitude of the focus error signal near the focus point.

This first output and second output obtained from the two lasers are compared. The output with the larger amplitude is determined to be the focus error signal obtained with the laser suited for the disk. In other words, if the laser 7 is a CD laser and the laser 8 is a DVD laser, and if the amplitude of the focus error signal obtained with the laser 8 is larger than that obtained with the laser 7, then the disk can be determined to be a DVD disk. Instead of focus error signals, the peak levels of the summed signal from the detector can be used as the first output and the second output. Alternatively, both the focus error signals and the summed signals can be used.

After the first disk discrimination operation is performed, the appropriate laser is selected based on the discrimination result and the position information on the disk recorded ahead of time is read. This information is sent to the wobble signal processing circuit 22, and the output from the signal processing circuit 21 is sent to the disk type discrimination circuit 18 to determine if the disk position information can be read or not. If the information can be read, the first disk discrimination result is assumed to be correct. If the information cannot be read, the disk is assumed to be the other disk type, and the other laser is turned on or the gain of the read detector 6 is switched to perform the read operation. If the information is readable, this discrimination result is used as the disk type discrimination result.

The following is a description, with references to the flowchart in FIG. 2, of how laser wavelength and output should be controlled when performing disk discrimination for CD disks, such as CD-Rs and CD-RWs, and DVD disks such as DVD-RAMs.

When the disk is mounted at step 28, the disk is rotated at 5 Hz or higher, as shown in step 29. Then, at step 30, a laser with a wavelength of 700 nm or higher (the CD laser in this embodiment) is lit so that the objective lens output is at least 2 mW. Since CD disks have high absorption properties for lasers with wavelengths of 700 nm or less, shining a laser with a wavelength of 700 nm or less can damage the recording surface. However, the reflectance is high for lasers with wavelengths of 700 nm or more, so there will be no damage from using a laser with a wavelength of 700 nm or higher at 2 mW or less with the disk spinning at a rate of 5 Hz or higher. Similarly, information will not be recorded to DVD disks under these conditions.

Next, at step 32, the objective lens is moved in the focusing direction, and the amplitude of the focus error signal near the focal point is obtained as the first output. This focus error signal amplitude is compared with a predetermined value (set value), and if the first output is larger the disk is assumed to be a CD disk. If the first output is smaller than the set value, the disk is assumed to be a DVD-RAM disk.

Step 34 is performed when, at step 32, the first output was larger than the set value and the disk is assumed to be a CD disk. In this case, a laser with a wavelength of 700 nm or less is applied with an objective lens output of 1 mW or less. The objective lens is moved in the focus direction, and the amplitude of the focus error signal near the focal point is obtained as the second output. Due to absorption properties of CD disks when rotated at 5 Hz or higher, applying a laser with a wavelength of 700 nm or less will not lead to accidental recording if the output is 1 mW or less.

Step 33 is performed when, at step 32, the first output was smaller than the set value and the disk is assumed to be a DVD disk. In this case, a laser with a wavelength of 700 nm or less is turned on with an objective lens output of 0.3 mW or higher. The objective lens is moved in the focus direction, and the focus error signal near the focal point is obtained as the second output.

Then, at step 35, the first output and the second output from the detector are compared and disk discrimination is performed as described above. Also, as described above, instead of focus error signal amplitude, it would also be possible to use the peak level of summed signals from the detector.

With this disk discrimination operation, accidental recording of data to disks is prevented, and disk discrimination can be performed without damaging the recording surfaces of disks. By switching encoders and the like based on the disk type after disk discrimination is performed, a single information recording and reproducing apparatus can be used to record data to multiple types of disks that use different wavelengths to record data.

With the embodiment described above, a single information recording and reproducing apparatus can be formed to record data to multiple types of disks that use different wavelengths to record data. Disk types can be determined accurately without damaging disks by accidentally recording data during the disk type discrimination operation. Since recording operations can be performed based on disk type, the user can record data without having to operate special switches.

What is claimed is:

1. An information recording and reproducing apparatus comprising:

a pickup including a first laser emitting light with a wavelength of at least 700 nm, a second laser emitting light with a wavelength of less than 700 nm, an objective lens focusing light emitted by said lasers onto a disk, and an optical detector detecting light reflected off of said disk from said lasers;

means for rotating said disk at at least 5 Hz before beaming light from said first laser or said second laser onto said disk;

means for driving said laser; and means for discriminating disks for discriminating a type of said disk using an amplitude of said reflected light obtained from said optical detector;

wherein:

after said rotating means begins rotating said disk at at least 5 Hz, said driving means turns on said first laser to emit light so that power exiting said objective lens is no more than 2 mW; and said discriminating means determines if a first amplitude is greater than a predetermined value, said first amplitude being an amplitude of reflected light obtained by said optical detector when said driving means turns on said first laser to emit light so that power exiting said objective lens is no more than 2 mW;

said discriminating means controls said laser driving means so that if said first amplitude is greater than the predetermined value said second laser emits light at no more than 1 mW and if said first amplitude is less than the predetermined value said second laser emits light at at least 0.3 mW, and a second amplitude of reflected light obtained by said optical detector when said second laser is turned on is compared with said first amplitude to perform disk discrimination.

2. An information recording and reproducing apparatus as described in claim 1 further comprising:

a first encoder and a first laser driver corresponding to information recording operations using said first laser; and a second encoder and a second laser driver corresponding to information recording operations using said second laser;

wherein information can be recorded to a plurality of disk types by selecting between said first encoder and said first laser driver and said second encoder and said second laser driver based on discrimination results from said disk discriminating means.

3. In a disk discrimination method for a recording and reproducing apparatus including a first laser emitting light with a wavelength of at least 700 nm, a second laser emitting light with a wavelength of less than 700 nm and capable of recording information to a plurality of disk types requiring lasers with different wavelengths for recording operations, a disk discrimination method for a recording and reproducing apparatus comprising the following steps:

turning on said first laser so that power exiting an objective lens is no more than 2 mW;

determining if a first amplitude of reflected light, obtained by an optical detector when said first laser is turned on to emit light so that power exiting said objective lens is no more than 2 mW, is less than a predetermined value;

turning on said second laser at no more than 1 mW and obtaining a second amplitude of reflected light if said first amplitude is greater than said predetermined value;

turning on said second laser at at least 0.3 mW and obtaining a second amplitude of reflected light if said first amplitude is less than said predetermined value; and comparing said first amplitude and said second amplitude to perform disk discrimination.

* * * * *